US008020032B2

(12) United States Patent
Abali et al.

(10) Patent No.: US 8,020,032 B2
(45) Date of Patent: Sep. 13, 2011

(54) METHOD FOR PROVIDING DEFERRED MAINTENANCE ON STORAGE SUBSYSTEMS

(75) Inventors: Bulent Abali, Tenafly, NJ (US); Mohammad Banikazemi, New York, NY (US); James Lee Hafner, San Jose, CA (US); Daniel Edward Poff, Mahopac, NY (US); Krishnakumar Rao Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/965,015

(22) Filed: Dec. 27, 2007

(65) Prior Publication Data
US 2009/0172468 A1    Jul. 2, 2009

(51) Int. Cl.
*G06F 11/00* (2006.01)
(52) U.S. Cl. ............. 714/3; 714/6.1; 714/6.2; 714/42
(58) Field of Classification Search .......... 714/3, 6, 714/7, 6.1, 6.11, 6.12, 6.2, 6.22, 6.32, 25, 714/42
See application file for complete search history.

(56) References Cited

U.S. PATENT DOCUMENTS

| | | | |
|---|---|---|---|
| 5,258,984 A | 11/1993 | Menon et al. | |
| 5,351,246 A | 9/1994 | Blaum et al. | |
| 5,485,571 A | 1/1996 | Menon | |
| 5,657,439 A | 8/1997 | Jones et al. | |
| 6,598,174 B1 | 7/2003 | Parks et al. | |
| 7,099,994 B2 * | 8/2006 | Thayer et al. | 711/114 |
| 2004/0260967 A1 | 12/2004 | Guha et al. | |
| 2005/0044454 A1 * | 2/2005 | Moshayedi | 714/54 |
| 2005/0081087 A1 | 4/2005 | Yagisawa et al. | |
| 2005/0193237 A1 * | 9/2005 | Topham | 714/6 |
| 2005/0193273 A1 | 9/2005 | Burkey | |
| 2006/0015771 A1 | 1/2006 | Van Gundy et al. | |
| 2006/0101205 A1 | 5/2006 | Bruning, III et al. | |
| 2008/0266999 A1 * | 10/2008 | Thayer | 365/230.03 |

* cited by examiner

*Primary Examiner* — Scott T Baderman
*Assistant Examiner* — Sarai Butler
(74) *Attorney, Agent, or Firm* — IP Authority, LLC; Ramraj Soundararajan

(57) ABSTRACT

A set of disks in a plurality of disk arrays are configured to have one or more spare partitions. Upon detecting a faulty disk in a faulty array, the method involves the steps of: (a) migrating data in the faulty array containing the faulty disk to one or more spare partitions; (b) reconfiguring the faulty array to form a new array without the faulty disk; (c) migrating data from one or more spare partitions in the set of disks to the reconfigured new array; (d) monitoring to identify when overall spare capacity falls below a predetermined threshold; and when the predetermined threshold is exceeded, scheduling a service visit for replacement of the failed disks.

21 Claims, 6 Drawing Sheets

METHOD FOR PROVIDING DEFERRED MAINTENANCE ON STORAGE SUBSYSTEMS

BACKGROUND OF THE INVENTION

1. Field of Invention

The present invention relates generally to the field of storage system maintenance. More specifically, the present invention is related to a method for providing deferred maintenance on storage subsystems.

2. Discussion of Prior Art

Storage needs of typical datacenters have been increasing for some time and are expected to continue to increase in the foreseeable future. Even though the capacity of disk drives has been increasing, the increase in storage requirements results in having more disk drives and more storage systems in a datacenter.

The typical service model for most storage systems is an on-demand model—when a disk drive fails, one of the available spares is used to rebuild the data of the failed drive. In the meantime, a service engineer who is also notified about the failure, schedules a visit, usually within 24 hours, to replace the failed drive with a new one, which now becomes the new spare. (In some implementations, the new drive is inserted into the array after copying it with data from the spare, thereby returning the spare back to the pool.) For datacenters with several disk drives (500 or more), the probability that there is at least one failed disk drive at any point in time is fairly high.

The on-demand maintenance model has the following adverse effects on large installations—high service costs associated with service engineer visits for replacing drives, and the possibility that the wrong drive could be pulled out of the system.

In order to reduce costs associated with on-demand maintenance of disk drives, a deferred maintenance model is sometimes used. In this case, a pool of spare disk drives is created so that multiple spares are available. When a disk drive fails, one spare from the pool is used for replacement. If a second drive fails, another one from the pool can be used. Service action is required only when the number of spares falls below a minimum.

Rather than scheduling a visit for each individual drive failure, the service engineer can bunch multiple replacement actions into a single visit and minimize service costs. Such a scheme can work with large storage systems with several disk drives where the pool of spares can be used for replacement across all the drives connected to the system.

FIG. 1 illustrates a large storage system, wherein such a large storage system is composed of 100-500 drives. In such a storage system, a large pool of spare drives can easily be created in order to defer maintenance actions. The spare drives can be accessed by the controllers in order to replace any of the drives that have failed within the storage system. It should be noted that the two controllers depicted in FIG. 1 are typically used in an active-active configuration, i.e. under normal conditions, both controllers actively manage the drives, but should one controller fail, the other manages the entire set of drives until the failed controller is replaced. The drives are all configured using a RAID scheme so that on a drive failure, there is no data loss. However, a spare needs to be brought into the array with the failed drive in order to replace it. The array is operational during the failure and the rebuild phase where data corresponding to the failed drive is being rebuilt onto the spare. However, if it loses another drive (for RAID schemes that can tolerate only one failure such as RAID 5 and RAID 1), there will be data loss. Once data has been rebuilt on the spare, the array can tolerate the failure of another drive.

However, in installations with several storage subsystems, each having a limited number of disk drives, a large pool of spares that can be used by all the storage subsystems cannot be created as each storage subsystem can only use disk drives that are directly connected. Such installations have applications in environments where the storage subsystems lack scalability because of cost considerations, or lack the performance to handle large numbers of disk drives.

Such a small storage system is depicted in FIG. 2, which is only composed of, for example, 10-30 drives. In such a system, creating a large pool of spares will imply that a large fraction of the drives will not be used for active storage lowering the utilization and increasing the cost.

Accordingly, it is necessary to develop a scheme that can bring the benefits of deferred maintenance to installations where there are several storage subsystems, each having a limited number of disk drives.

Whatever the precise merits, features, and advantages of the above cited references, none of them achieves or fulfills the purposes of the present invention.

SUMMARY OF THE INVENTION

The present invention provides for a computer-based method for deferring maintenance in a storage system comprising a plurality of storage subsystems, each subsystem containing a disk array formed from a set of disks, with each disk array being configured to have one or more spare partitions in addition to one or more data partitions, and the computer-based method, upon detecting a faulty array containing a faulty disk, comprising the steps of: (a) migrating data in the faulty array containing the faulty disk to one or more spare partitions in the remaining arrays; (b) reconfiguring the faulty array to form a new array without the faulty disk; (c) migrating data from one or more spare partitions from the other arrays to the reconfigured new array in (b) without the faulty disk; (d) monitoring to identify when overall spare capacity in all the disk arrays falls below a predetermined threshold; and wherein when the predetermined threshold is exceeded, the computer-based method schedules a service visit for replacement of failed disks. The present invention also provides an article of manufacture that implements the above-mentioned method.

In the preferred embodiment, the spare partitions in each disk of a disk array are equal in size.

In another extended embodiment, after replacement of failed drives based on the scheduled visit, the method further comprises the steps of: (e) migrating data in each previously faulty array to one or more spare partitions in the remaining arrays; (f) reconfiguring each previously faulty array to include newly replaced disks; and (g) migrating data back to the reconfigured array in (f).

In another extended embodiment, the method further comprises the step of permanently maintaining the migrated data in (a) in one or more spare partitions.

The present invention, in an extended embodiment, incorporates a virtualizing layer that ensures migrations are transparent to hosts and applications accessing data in the disk arrays.

Each disk array is implemented as a RAID array. Specific examples of RAID types that can be implemented in conjunction with the invention include, but are not limited to, RAID 1, RAID 5 or RAID 6.

The present invention also provides for a computer-based method for deferring maintenance on storage systems, wherein the computer-based method comprises the steps of: (a) designating a subset of disks in a set of storage subsystems to serve as a partial spare pool; (b) creating disk arrays in each storage subsystem including the partial spare pool; (c) configuring the partial spare pool to have spare partitions in addition to data partitions; (d) upon detecting a faulty array containing a faulty disk, migrating data in the faulty array to spare storage distributed across said partial spare pool; (d) reconfiguring the faulty array to bypass the faulty disk; (e) migrating data from the portion of the spare storage space to the reconfigured array in (d); wherein when overall spare capacity falls below a threshold, a service visit is scheduled to replace all failed drives.

DESCRIPTION OF THE PREFERRED EMBODIMENTS

Figure 1:
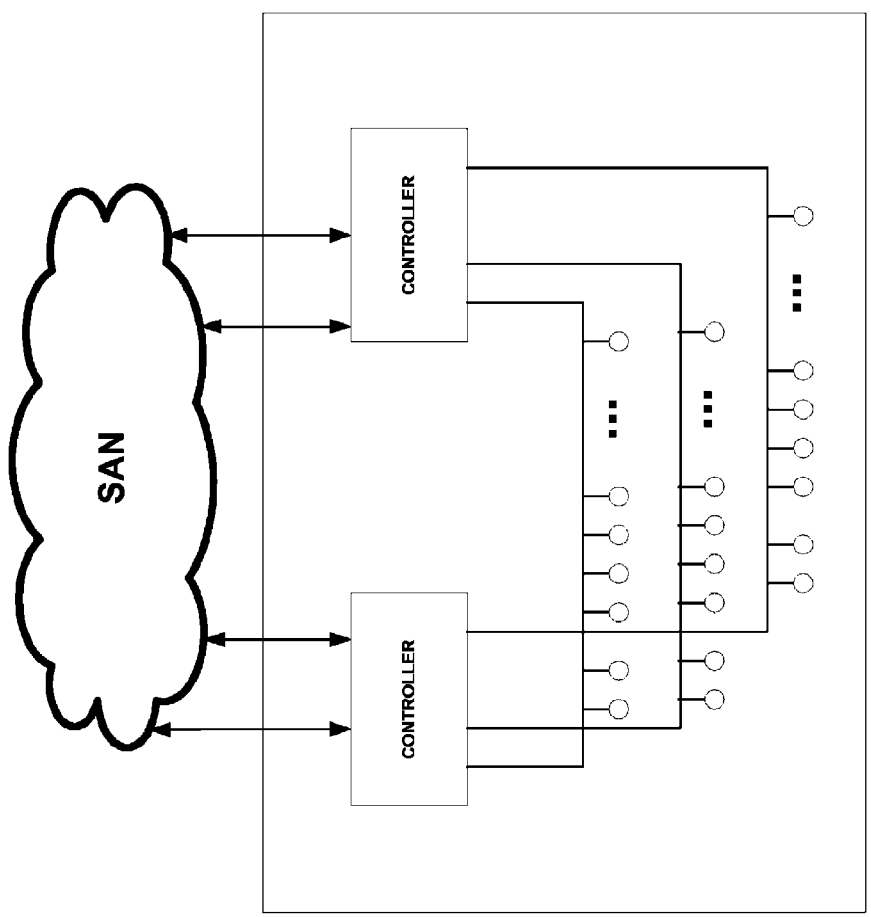
FIG. 1 illustrates a large storage system, wherein such a large storage system is composed of 100-500 drives.
Figure 2:
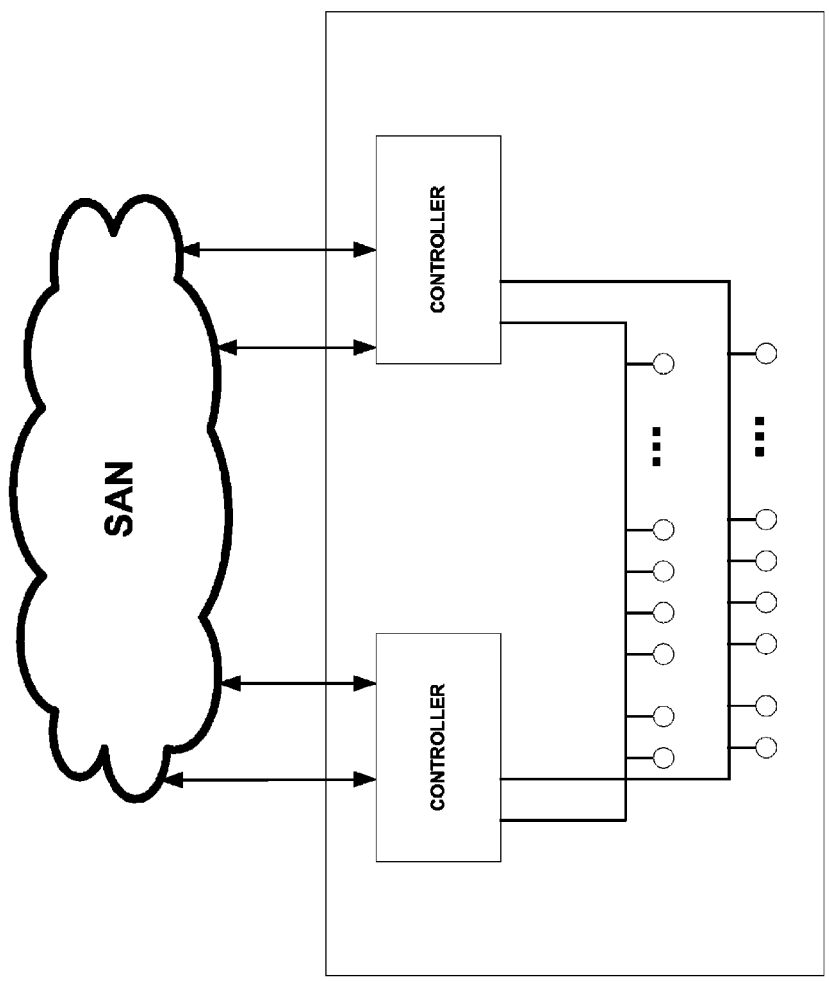
FIG. 2 illustrates a small storage system, wherein such a small storage system is composed of 10-30 drives.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 3:
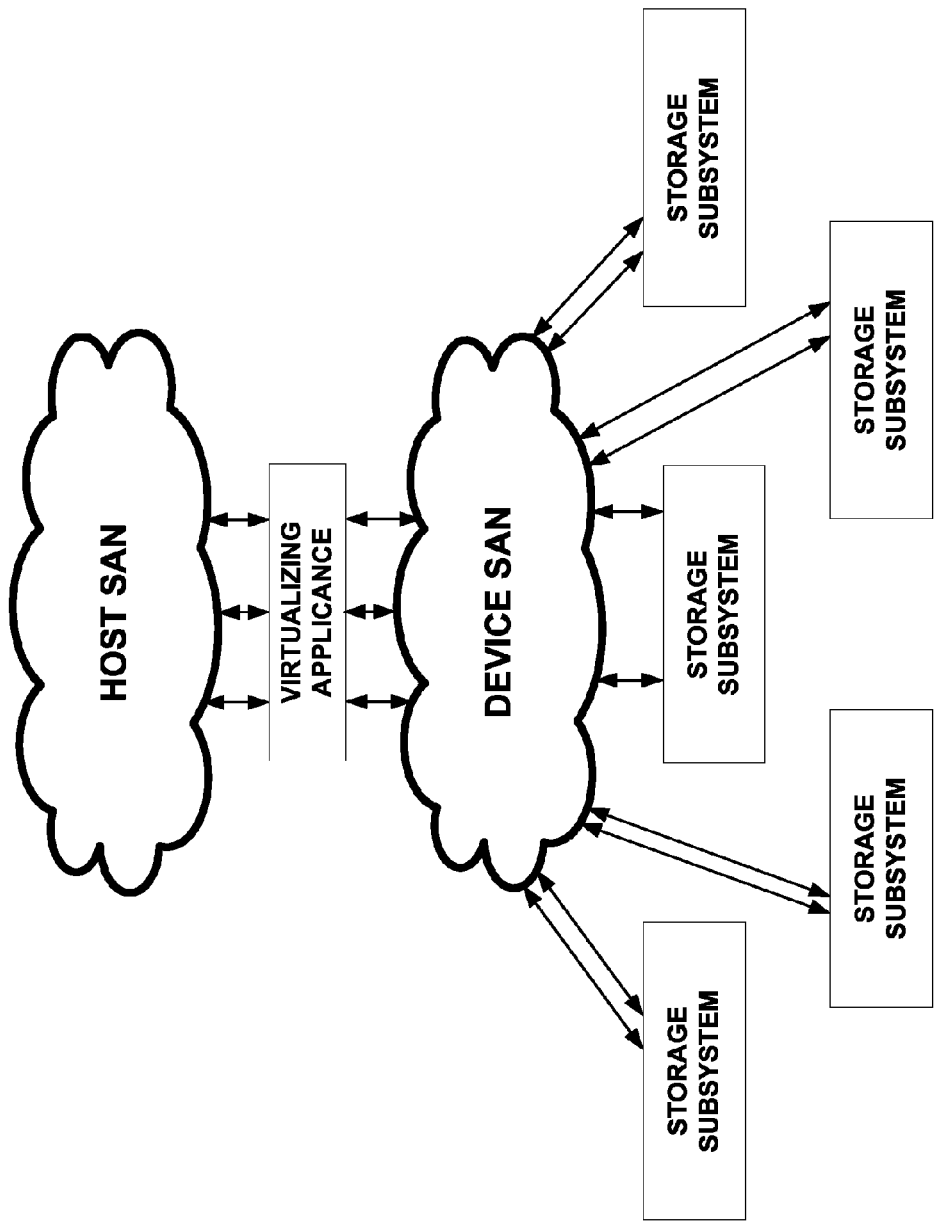
FIG. 3 shows an installation that uses multiple small storage systems.

FIG. 3 shows an installation that uses multiple small storage systems (referred to as subsystems now, because the storage system consists of the entire set of subsystems plus the virtualizing appliance). In such an installation, the spare drives on one subsystem cannot be used by another subsystem because each subsystem can only access its own drives. It is in installations of this type that the invention will enable providing the benefits of deferred maintenance. Spare capacity is distributed through all the subsystems. Each subsystem may have only a small spare capacity, say equivalent to a single drive. But by having many subsystems, there are effectively many 'spare' drives in a logical sense. Now when any drive fails, data on the affected array is distributed onto the spare capacity of the remaining subsystems. The array is reconfigured to remove the failed drive (e.g. if it was a RAID 5 on 15 drives, it will be reconfigured to be a RAID 5 on 14 drives). At the end of the reconfiguration, the array can now tolerate another drive failure. Data which was migrated out of the array is now migrated back onto it.

Figure 4:
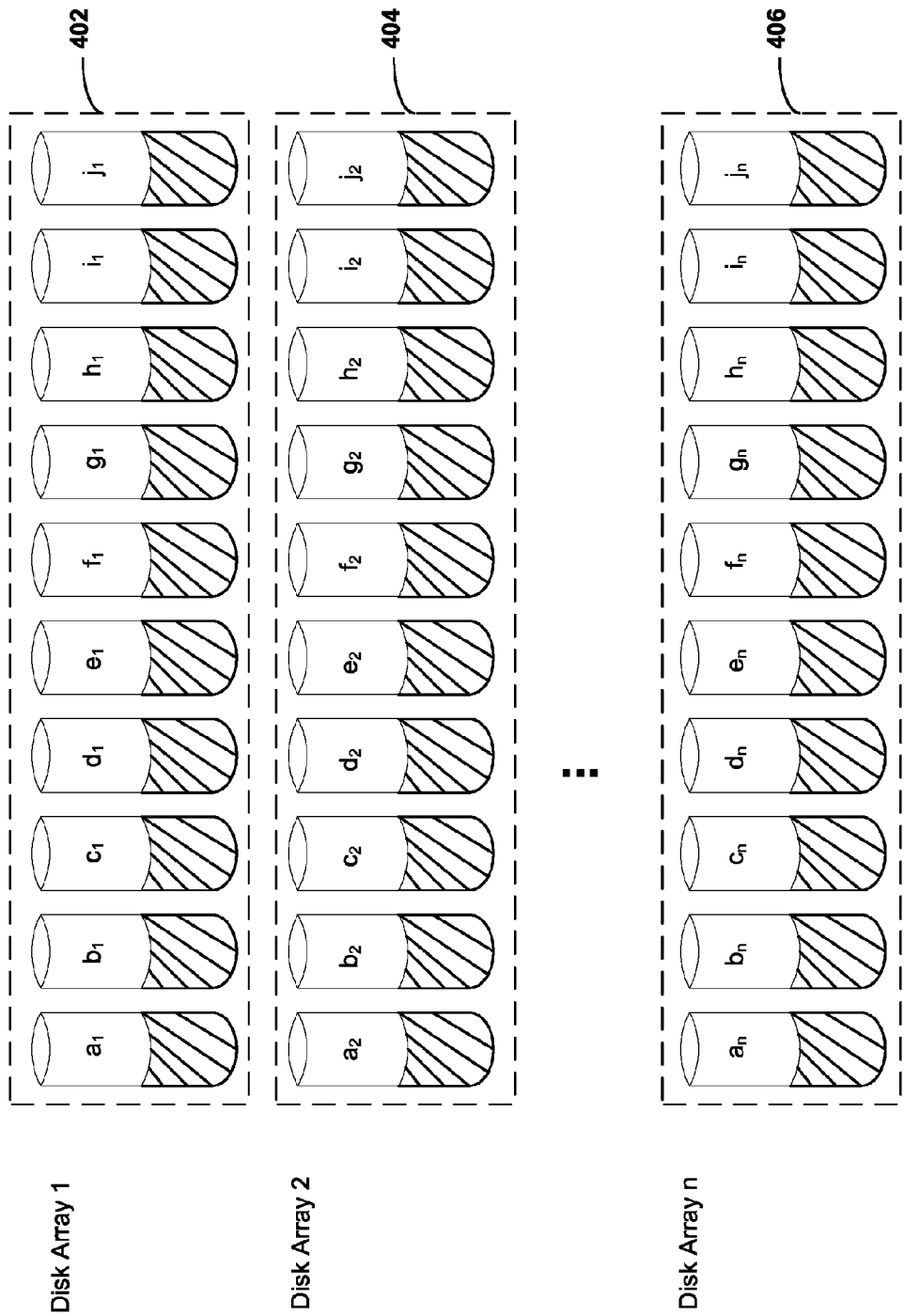
FIG. 4 illustrates an example of a storage system as per the teachings of the present invention.

FIG. 4 illustrates a non-limiting example of a storage system as per the teachings of the present invention. In FIG. 4, a plurality of disk arrays 402, 404, and 406 are created across the entire set of (homogeneous) storage subsystems in the installation. In this non-limiting example, disk array 402 contains disks $a_1, b_1, c_1, d_1, e_1, f_1, g_1, h_1, i_1,$ and $j_1$; disk array 404 contains disks $a_2, b_2, c_2, d_2, e_2, f_2, g_2, h_2, i_2,$ and $j_2$; and disk array 406 contains disks $a_n, b_n, c_n, d_n, e_n, f_n, g_n, h_n, i_n$ and $j_n$. According to the teachings of the present invention, specific drives are not marked as spares, but physical space corresponding to the amount of sparing required is distributed across all the arrays. Thus, each array will not be packed completely with user data—there will be spare capacity available. The shaded areas in each drive shown in FIG. 1 correspond to space allocated for the spare data. Although FIG. 1 depicts an equal number of drives in disk arrays 402, 404 and 406, it should be noted that the number of drives can vary and does not have to be equal.

Although FIG. 4 depicts each drive with a spare partition (the shaded area), it should be noted that a subset among the set of drives can be designated to have the spare partition that stores the spare data. Also, the spare data can be striped across this subset of drives.

In the preferred embodiment, the spare partition in each drive (or each of the subset of designated drives) for a given array is identical in size. However, it should be noted that variations in the size of the spare partitions between drives can be implemented, if desired.

Figure 5:
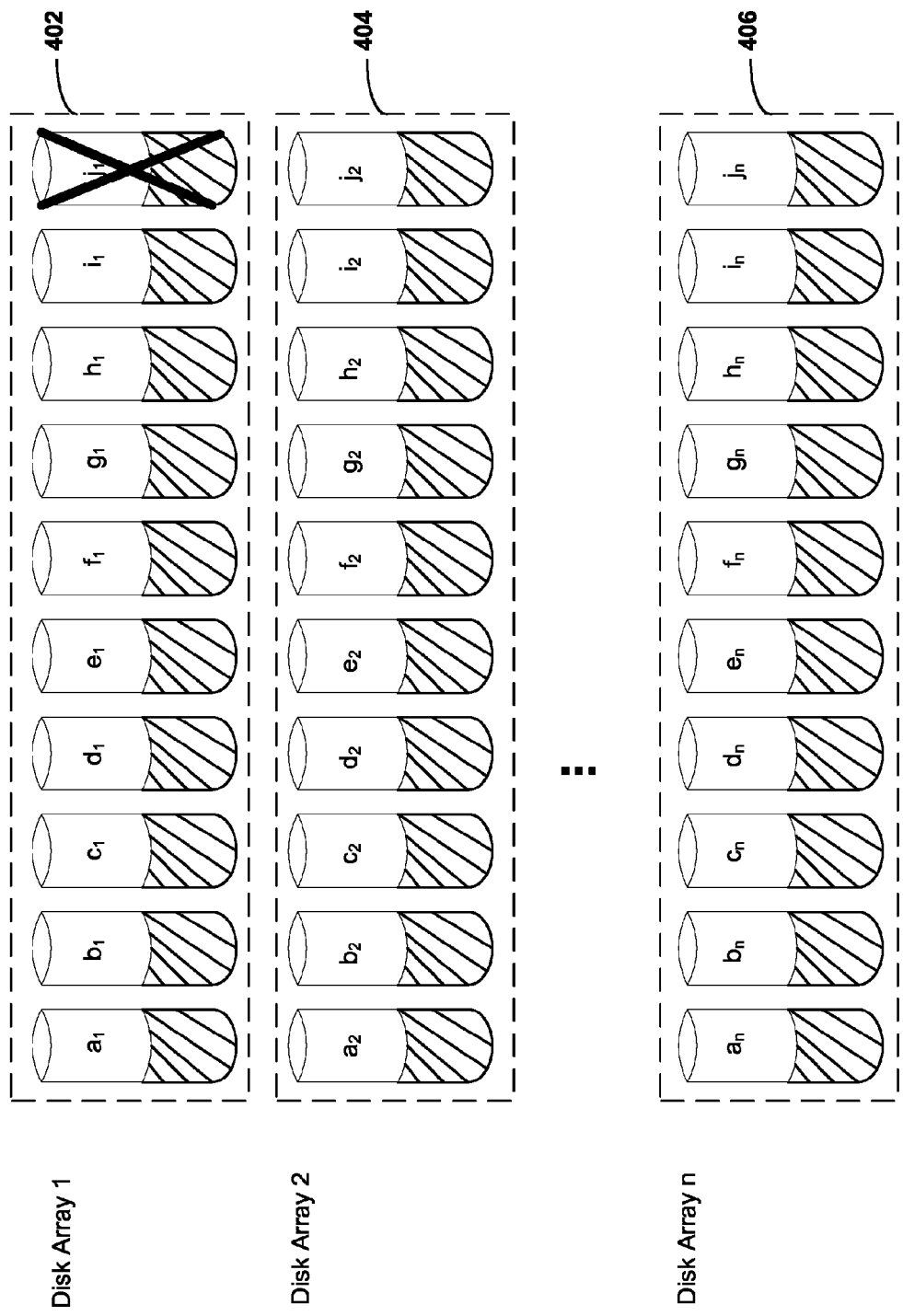
FIG. 5 illustrates an example of a storage system with a failed drive j1.

According to the teachings of the present invention, when a drive fails, the data in the array (that has the failed drive) is migrated to spare space available in the other arrays, thereby emptying the original array. For example, FIG. 5 illustrates a scenario in which drive $j_1$ in disk array 402 has failed. Disk array 402 needs to be reconfigured to remove faulty drive $j_1$ from it. To accomplish this, the data corresponding to disk array 102 (i.e., data in drive $a_1, b_1, c_1, d_1, e_1, f_1, g_1, h_1,$ and $i_1$) is copied into one or more spare partitions in the remaining disk arrays (i.e., disk array 1-404 through disk array n-406).

Figure 6:
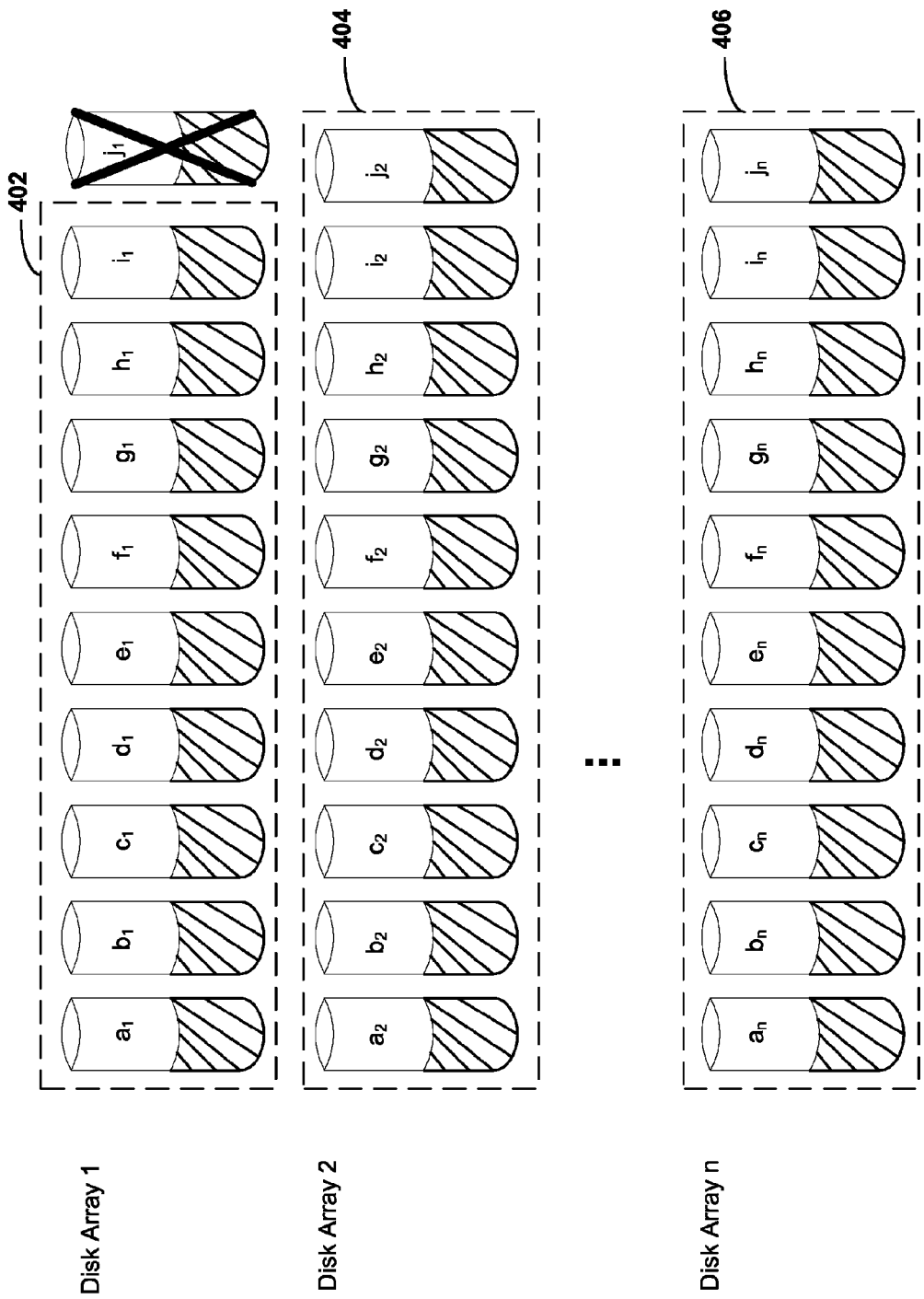
FIG. 6 illustrates an example of a reconfigured storage array in a storage system as per the teachings of the present invention.

When, such copying is complete, disk array 402 is now reconfigured to remove the failed drive from it. A reconfigured example is shown in FIG. 6, where faulty drive $j_1$ is removed from disk array 402 and the new disk array 402 is configured with drives $a_1, b_1, c_1, d_1, e_1, f_1, g_1, h_1,$ and $i_1$.

Next, data that was moved to the spare space in the other arrays is now migrated back to the original array.

In one embodiment, some of this data (that corresponds to the capacity of one drive) may be left in the spare space of one or more of the other arrays permanently.

A virtualizing layer above ensures that migrations are transparent to the hosts and applications that are accessing the data. Such a virtualizing layer is implemented either in an in-band appliance, as an out-of-band appliance, as part of the storage system, or in the storage (or SAN) switch. The present invention can be implemented in conjunction with storage virtualization techniques outlined in the book titled "IBM System Storage SAN Volume Controller".

When the overall spare capacity falls below a threshold, a service visit is scheduled to replace all the failed drives in the installation. Following the replacement operation, similar migration can be performed one-at-a-time to:

empty arrays in subsystems with replaced drives of all data,
reconfigure these arrays to include the replacement drives, and
migrate data back to these arrays.

The spare capacity falls because of the accumulating faulty disks (i.e., the combined spare capacity across all the arrays is progressively used to hold the data that was previously contained in drives that have failed).

In one embodiment, the spare partition in the drives (or in the subset of designated drives) can be dynamically varied depending on the storage need of the storage facility.

As can be seen from the above elements, this scheme can provide the benefits of deferred maintenance with existing RAID storage subsystems, particularly RAID 1, RAID 5 or RAID 6 systems.

It should be noted that this invention is external to storage subsystems and can be used without making any changes to existing storage subsystems.

According to one embodiment, the present invention provides for a computer-based method for deferring maintenance in a storage system comprising a plurality of disk arrays formed from a set of disks, with each array being configured to have a spare partition in addition to a data partition, and the computer-based method, upon detecting a faulty array containing a faulty disk, comprising the steps of: (a) migrating data in the faulty array containing the faulty disk to one or more spare partitions in the remaining arrays; (b) reconfiguring the faulty array to form a new array without the faulty disk; (c) migrating data from one or more spare partitions in the remaining arrays to the reconfigured new array in (b) without the faulty disk; (d) monitoring to identify when overall spare capacity in the subset of disks falls below a predetermined threshold; and wherein when the predetermined threshold is exceeded, the computer-based method schedules a service visit for replacement of failed disks.

The present invention also provides an article of manufacture that implements the above-mentioned method.

In another extended embodiment, after replacement of failed drives based on the scheduled visit, the method further comprises the steps of: (e) migrating data in each previously faulty array to one or more spare partitions in the remaining arrays; (f) reconfiguring each previously faulty array to include newly replaced disks; and (g) migrating data back to the reconfigured array in (f).

In another extended embodiment, the method further comprises the step of permanently maintaining the migrated data in (a) in one or more spare partitions.

The present invention, in an extended embodiment, incorporates a virtualizing layer that ensures migrations are transparent to hosts and applications accessing data in the disk arrays.

In the preferred embodiment, the spare partitions on each disk in a disk array are equal in size.

Each disk array is implemented as a RAID array. Specific examples of RAID types that can be implemented in conjunction with the invention include, but are not limited to, RAID 1, RAID 5 or RAID 6.

In another embodiment, the present invention also provides for a computer-based method for deferring maintenance on storage systems, wherein the computer-based method comprises the steps of: (a) designating a subset of disks in a set of storage subsystems to serve as a partial spare pool; (a) creating disk arrays in each storage subsystem including the partial spare pool; (c) configuring the partial spare pool to have spare partitions in addition to data partitions; (d) upon detecting a faulty array containing a faulty disk, migrating data in the faulty array to the spare storage distributed across said partial spare pool; (d) reconfiguring the faulty array to bypass the faulty disk; (e) migrating data from the portion of the spare storage space to the reconfigured array in (d); wherein when overall spare capacity falls below a threshold, a service visit is scheduled to replace all failed drives.

Additionally, the present invention provides for an article of manufacture comprising computer readable program code contained within implementing one or more modules to a method for providing deferred maintenance on storage subsystems. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides for an article of manufacture comprising a computer user medium having computer readable program code embodied therein which implements a method for deferring maintenance in a storage system comprising a plurality of disk arrays formed from a set of disks, with a subset of disks among said set of disks being configured to have an identically sized spare partition in addition to a data partition, wherein, upon detecting a faulty array containing a faulty disk: (a) computer readable program code aiding in migrating data in said faulty array containing said faulty disk to one or more spare partitions in said subset of disks; (b) computer readable program code aiding in reconfiguring said faulty array to form a new array without said faulty disk; (c) computer readable program code aiding in migrating data from the one or more spare partitions in said subset of disks to said reconfigured new array in (b) without the faulty disk; (d) computer readable program code aiding in monitoring to identify when overall spare capacity in said subset of disks falls below a predetermined threshold; and, when said predetermined threshold is exceeded, (e) computer readable program code aiding in schedules a service visit for replacement of failed disks.

CONCLUSION

A system and method has been shown in the above embodiments for the effective implementation of a method for providing deferred maintenance on storage subsystems. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by percentage of space allocated for the spare partition, number of drives in an array, software/program, computing environment, or specific computing hardware.

The above enhancements are implemented in various computing environments. For example, the present invention may be implemented on a server or equivalent, multi-nodal system (e.g., SAN or LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of storage systems.

The invention claimed is:

1. A computer-based method for deferring maintenance in a storage system comprising a plurality of storage subsystems each containing a disk array formed from a set of disks, with each disk being configured to have one or more spare partitions in addition to one or more data partitions, said computer-based method comprising the steps of:

a. detecting at least one faulty array containing a faulty disk within said plurality of storage subsystems;
b. migrating data in said faulty array containing said faulty disk to one or more spare partitions in at least one array in a different storage subsystem;
c. reconfiguring said faulty array to form a new array without said faulty disk;
d. migrating data from said one or more spare partitions in said at least one array in a different storage subsystem to said reconfigured new array in (c) without said faulty disk;
e. monitoring and identifying when overall spare capacity in said spare partitions across said plurality of storage subsystems falls below a predetermined threshold; and wherein when said predetermined threshold is exceeded, said computer-based method schedules a service visit for replacement of failed disks.

2. The computer-based method of claim 1, wherein said spare partitions are identical in size.

3. The computer based method of claim 1, wherein a ratio between said data partitions and said spare partitions in each disk array is dynamically varied by said storage system according to storage needs.

4. The computer-based method of claim 1, wherein a virtualizing layer ensures migrations are transparent to hosts and applications accessing data in said disk arrays.

5. The computer-based method of claim 1, wherein after replacement of failed drives based on said scheduled visit, said method further comprises the steps of:
f. migrating data in disks associated with each previously faulty array to one or more spare partitions;
g. reconfiguring said each previously faulty array to include newly replaced disks; and
h. migrating data back to said reconfigured array in (g).

6. The computer-based method of claim 1, wherein each of said disk arrays is a RAID array.

7. The computer-based method of claim 6, wherein said RAID array is any of the following: RAID 1, RAID 5 or RAID 6.

8. The computer-based method of claim 1, wherein said computer-based method further comprises permanently maintaining said migrated data in (b) in said one or more spare partitions.

9. A computer-based method for deferring maintenance on storage systems, said computer-based method comprising:
a. creating a plurality of disk arrays from a set of disks;
b. designating a subset of disks in said set of disks to serve as a spare pool, wherein an equal portion of each disk in said subset of disks is dedicated for spare storage;
c. detecting a faulty array containing a faulty disk within said plurality of disk arrays;
d. migrating data in said faulty array to said subset of disks serving as said spare pool, wherein said migration is across said equal portions of each disk in said subset of disks serving as said spare pool;
e. reconfiguring said faulty array to bypass said faulty disk;
f. migrating data from said subset of disks serving as said spare pool to said reconfigured array in (e);
g. monitoring and identifying when an overall spare capacity in said subset of disks serving as said spare pool falls below a threshold, and
wherein when overall spare capacity falls below said threshold, a service visit is scheduled to replace all failed drives.

10. The computer-based method of claim 9, wherein a virtualizing layer ensures that said migrations in (d) and (g) are transparent to hosts and applications accessing data in said disk arrays.

11. The computer-based method of claim 9, wherein each of said disk arrays is a RAID array.

12. The computer-based method of claim 11, wherein said RAID array is any of the following: RAID 1, RAID 5 or RAID 6.

13. The computer-based method of claim 9, wherein said computer-based method further comprises permanently maintaining said migrated data in (d) in said one or more spare partitions.

14. An article of manufacture comprising a computer user medium having computer readable program code embodied therein which implements a method for deferring maintenance in a storage system comprising a plurality of storage subsystems, each containing a disk array formed from a set of disks, with each disk array being configured to have one or more spare partitions in addition to a one or more data partitions, said medium comprising:
a. computer readable program code detecting at least one faulty array containing a faulty disk within said plurality of storage subsystems;
b. computer readable program code migrating data in said faulty array containing said faulty disk to one or more spare partitions in at least one array in a different storage subsystem;
c. computer readable program code reconfiguring said faulty array to form a new array without said faulty disk;
d. computer readable program code migrating data from said one or more spare partitions in said at least one array in a different storage subsystem to said reconfigured new array in (c) without said faulty disk;
e. computer readable program code monitoring and identifying when overall spare capacity in said spare partitions across said plurality of storage subsystems falls below a predetermined threshold; and
f. when said predetermined threshold is exceeded, computer readable program code aiding in schedules a service visit for replacement of failed disks.

15. The article of manufacture of claim 14, wherein said medium further comprises a virtualizing layer that ensures migrations are transparent to hosts and applications accessing data in said disk arrays.

16. The article of manufacture of claim 14, wherein each of said disk arrays is a RAID array.

17. The article of manufacture of claim 16, wherein said RAID array is any of the following: RAID 1, RAID 5 or RAID 6.

18. The article of manufacture of claim 14, wherein said medium further comprises computer readable program code to aid in permanently maintaining said migrated data in (b) in said one or more spare partitions.

19. The article of manufacture of claim 14, wherein the ratio between said data partitions and said spare partitions in each disk array is dynamically varied by said storage system according to storage needs.

20. The article of manufacture of claim 14, wherein said spare partitions are equal in size.

21. The article of manufacture of claim 14, wherein only a subset of disks in said set of disks are configured to have said one or more spare partitions.

* * * * *